Sept. 14, 1948.  L. FREINKEL  2,449,065
CONTROL SYSTEMS FOR SYNCHRONOUS MOTORS
Filed March 12, 1946
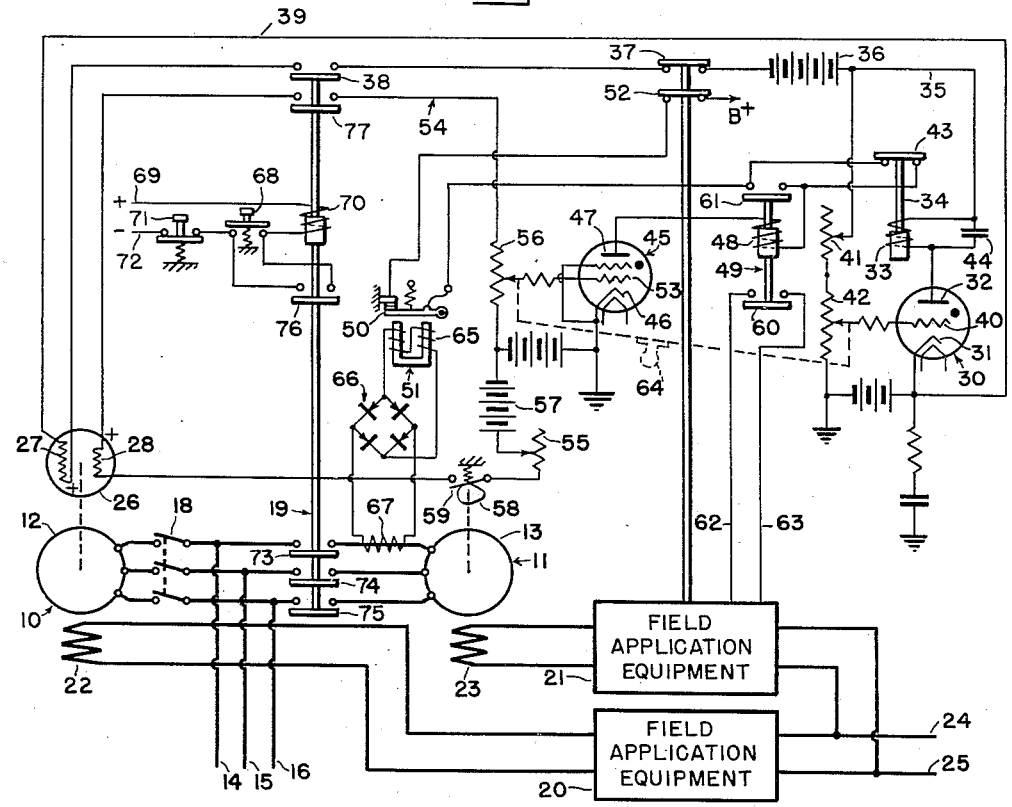
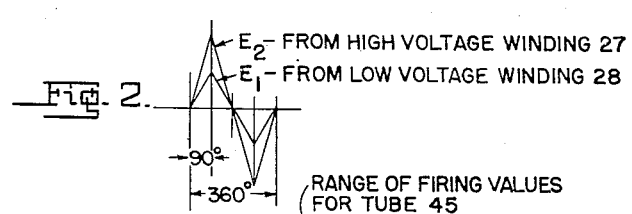
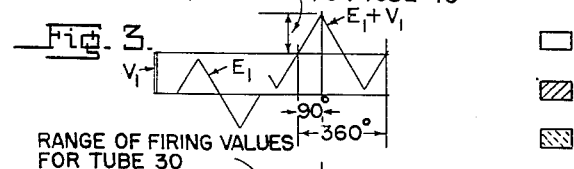
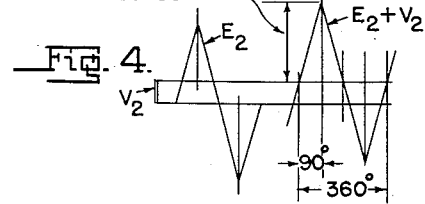
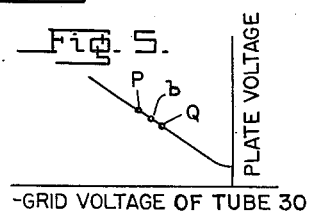
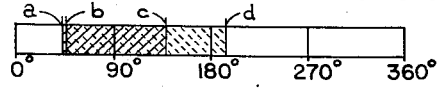
INVENTOR.
Leonard Freinkel
BY
ATTORNEY.

Patented Sept. 14, 1948

2,449,065

UNITED STATES PATENT OFFICE 2,449,065

CONTROL SYSTEM FOR SYNCHRONOUS MOTORS

Leonard Freinkel, Washington, D. C.

Application March 12, 1946, Serial No. 653,920

6 Claims. (Cl. 318—41)

(Granted under the act of March 3, 1883, as amended April 30, 1928; 370 O. G. 757)

The invention relates to improvements in control systems for synchronous motors and more particularly to an improved control system for synchronizing a plurality of synchronous motors with their rotary members disposed in predetermined angular rotational relation.

When varying loads are driven by a plurality of synchronous motors it is desirable that the peak loads on all the motors do not occur at the same time or that the shafts are not disposed in certain positions at the same time giving rise to conditions of resonance. In previous synchronizing systems, the relative operating positions of the rotary members have been determined by the relative positions of contactors or of impulse or pilot generators driven by the motors so that to change the relative rotor positions at which the motors will operate requires that the position of a contactor or generator be shifted. One object of this invention is to obviate the necessity for such a change and achieve a variable relative operating position by simple and novel means.

Another object of the invention is to provide means including a contactor and pilot generator for selecting a predetermined operating relation between the rotary members of a plurality of synchronous motors.

A further object of the invention is to provide mechanism for selecting a predetermined operating relation between the rotary members of a plurality of synchronous motors and which mechanism is readily adjustable to select the operating relation from a remote location.

A still further object is the provision of improved means for controlling the successive synchronization of synchronous motors by electric discharge devices that are made responsive to the variably selected relative angular positions of the rotary members of the motors.

Other objects and advantages of the invention will become apparent during the course of the following detailed description, taken in connection with the accompanying drawing, forming a part of this specification, and in which drawing, Figure 1 is a diagrammatic view of my control system applied to a pair of synchronous motors provided with conventional field application equipment.

Figures 2-6 are diagrammatic views illustrating certain characteristics of the control system.

In the drawing, which shows only a preferred embodiment of the invention, the numerals 10 and 11 generally designate conventional synchronous motors having armatures 12, 13 energized with alternating current from buses 14, 15, 16 upon closing of switches 18, 19. Two sets 20, 21 of conventional field application equipment may be provided for controlling the excitation of the field windings 22, 23 of motors 10, 11 from direct current buses 24, 25.

Mounted on and directly driven by the motor 10 is a pilot generator 26 comprising a two-pole alternator having high- and low-voltage windings 27, 28, the ratio between these windings preferably being about two to one. Windings 27, 28 are adapted to produce voltages $E_2$, $E_1$, of peaked wave form, as illustrated in Figure 2, the means for attaining such wave forms being well known to those versed in the art. Inasmuch as the generator 26 operates in synchronism with the motor 10, the peak voltage point in its output can, by correct initial installation of the generator, be made to occur coincidental to disposition of the rotary member of the motor in a predetermined angular rotational position. Or, in other words, at a predetermined position of the motor shaft, the voltage output of the generator is at its maximum. As the pilot generator is a two-pole alternator, for every position of the shaft there is then a definite voltage output, evident from an inspection of Figure 2, which represents the generator voltage output for one complete revolution of the motor shaft.

In Figure 1 is shown an electron tube 30 of the gaseous type which receives its anode voltage from the high voltage winding 27 of the pilot generator through a circuit including cathode 31, anode 32, winding 33 of a high speed sensitive type relay 34, positive conductor 35, battery 36, normally closed contact member 37 forming part of the field application equipment 21, normally open contact member 38 of the main switch 19 for motor 11, high voltage winding 27 and negative conductor 39. Hence, assuming for the moment that some fixed bias exists on its control grid 40, the tube 30 will conduct when the impressed plate voltage reaches a value which is the tube's breakdown point as determined by its characteristic. This breakdown point will be some point $b$ in the region P—Q of the curve shown in Figure 5, which is a characteristic curve for the tube 30. Furthermore, as is typical of gaseous discharge tubes, the tube 30 will cease conducting when the plate voltage has fallen to a value below the ionization potential which is of the order of 8–10 volts. It will conduct again when the plate voltage has once more risen to the value of the firing point $b$. Hence, tube 30 will break down and conduct at intervals once during each revolution of the motor shaft to which the pilot generator, supplying anode voltage to the tube, is attached. Furthermore, since the tube 30 begins to conduct at point b, it breaks down at some definite position of the rotary member of the motor 10.

Because the plate voltage necessary for breakdown in a gaseous discharge tube is not a precise value for a given grid bias voltage, but may vary through a small range depending on the thermal condition of the tube and its previous firing history, use is made of the control ratio of the tube by introducing a control voltage superimposed on the bias voltage of the control grid 40 of the tube 30. This control voltage is a portion of the anode voltage applied to the grid 40 through a rheostat 41 and control potentiometer 42 as shown in Figure 1. Therefore, tube 30 now has its breakdown point controlled by both the instantaneous anode and grid voltages. It is now readily seen that if the grid has been driven to its desired firing point, and the plate voltage has not yet quite reached the value necessary to fire tube 30, then a very small further increase in the grid voltage will cause the tube to fire, since the grid voltage is many times as effective as the plate voltage in controlling the tube. Thus the actual firing point of tube 30 is very closely controlled.

Since gaseous discharge tubes cannot be readily controlled at low values of anode voltage and their control characteristic is not linear in this region, a direct current voltage $V_2$ is introduced by insertion of the battery 36 in the anode circuit, as shown in Figure 1. This voltage $V_2$, when superimposed on the alternating current voltage output $E_2$ of the pilot generator shifts the axis of the voltage wave $E_2$ in a downward direction, giving rise to an overall characteristic as indicated by the wave $E_2+V_2$ shown in Figure 4. It is now possible to control tube 30 through the entire first 90° of the voltage output of the pilot generator since at the start of its positive cycle the overall voltage existing in the anode circuit is large enough to permit ready control of firing.

Inasmuch as the winding 33 of relay 34 is in the anode circuit of tube 30, its normally closed contact member 43 opens and recloses once per revolution of the rotary member of motor 10, the opening position being selectable by adjustment of the control potentiometer 42. Shunting the relay winding 33 is a condenser 44 neutralizing the inductance of the winding and making the relay 34 fast acting. This relay 34 is readily capable of handling 30 pulses per second which is sufficient to take care of an 1800 R. P. M. synchronous motor, this speed being about as high as is met in practice.

In Figure 1 is shown another electron tube 45 of the screen-grid gaseous type having a steeper control characteristic than the tube 30; this tube 45 receiving its anode voltage from a direct current supply B+ through a circuit including cathode 46, anode 47, winding 48 of a fast acting relay 49, the normally closed contact member 43 of relay 34, normally closed contact member 50 of a current-actuated element 51, and normally closed contact member 52 forming part of the field application equipment 21. The control voltage, applied to the control grid 53 of tube 45 through a control circuit 54 including a rheostat 55 and potentiometer 56, is alternating voltage $E_1$ from the low-voltage winding 28 of the pilot generator and direct voltage $V_1$ from a battery 57 in series with the generator winding 28.

Fixed on the shaft of the synchronous motor 11 whose rotary member is to be synchronized in a predetermined rotational position relative to the rotary member of motor 10 is a cam 58 shaped to throw a contactor switch 59, serially connected with the low-voltage winding 28, momentarily into closed position once per revolution of the shaft of motor 11. Inasmuch as the cam 58 is fixed on the motor shaft, closing of the switch 59 will occur upon disposition of the rotary member of motor 11 in a definite angular rotational position.

Tube 45 will fire only when the algebraic sum of the direct current voltage $V_1$ supplied by battery 57, and the alternating voltage $E_1$ supplied by the pilot generator, as shown by the wave $E_1+V_1$ in Figure 3, is applied by contactor switch 59 and is sufficient to drive the biased control grid 53 to its firing point. Furthermore, the contact member 50 of the current-actuated element 51 and the normally closed contact member 43 of relay 34 must at the same time be closed.

Breakdown of tube 45 causes relay 49 to immediately close contact members 60, 61, thus energizing the field application equipment 21 through contact member 60 and conductors 62, 63 and also sealing itself in through contact member 61 to assure continuity of anode current B+ for the tube 45 independent of further action of the relay 34 and tube 30.

Preferably the potentiometers 42, 56 are mechanically connected to permit control by a single knob 64 whose settings may be calibrated in terms of angular displacement from 0° to 90°. The current-actuated element 51 includes a magnet winding 65 connected to a full-wave rectifier 66 supplied with alternating current from a transformer 67 energizable by heavy starting current drawn by the armature 13 of motor 11.

If desired, the main switch 19 for motor 11 may be electromagnetically closed by depressing a starting pushbutton 68 to complete an electric circuit via positive supply line 69, solenoid winding 70, pushbutton 68, stop pushbutton 71 and a negative supply line 72. Energization of the winding 70 actuates the switch 19, thereby closing contact members 73, 74, 75 to start motor 11 as an induction motor. At the same time, a contact member 76 forming part of the switch 19 is closed thus establishing a holding circuit shunting the starting pushbutton 68. Upon operation of switch 19, another contact member 77 closes therewith and places the control circuit 54 for the grid 53 of tube 45 in operating condition.

Preliminary to operation of my improved synchronizing control, it is assumed that motor 10 has been started by closing switch 18, and that its field application equipment 20 has operated to effect synchronization of its rotary member. It is also assumed that the filaments of the tubes 30, 45, have been suitably energized. Then upon closing switch 19 both tubes 30, 45 will commence receiving control voltages via contact members 38, 77 which close upon closure of switch 19. However, the instant switch 19 closes, the inrush current to the stator 13 of motor 11 energizes the current-actuated element 51 via the current transformer 67 and full-wave rectifier 66. The magnetic pull of the coil 65 of the current-actuated element attracts the armature 50 and opens the anode circuit of the tube 45. This contact armature 50 does not reclose until the stator current has fallen to the value obtaining when the motor 11 has accelerated to its maximum subsynchronous speed running as an induction motor. Thus tube 45 cannot function until this condition has been reached. After the armature 50 has again closed, the following conditions exist:

Tube 30 is firing once per revolution of the rotary member of motor 10 and has been set to fire at some point $b$ in Figure 6, which represents a given angular displacement from the start of the positive cycle of its anode voltage $E_2+V_2$. On the control grid 53 of tube 45 are impressed the combined voltages $E_1+V_1$. Inasmuch as the alternating component of this voltage combination $E_1+V_1$ is going through its cycle at synchronous speed and since the contactor 59 is closing once per revolution at subsynchronous speed, it is readily apparent that each time the contactor closes, the combined voltage $E_1+V_1$ will be of a different value.

Assuming now that the bias of tube 45 has been set so that the combined voltages $E_1+V_1$ at a point $a$ in Figure 6 (some angular displacement from the start of the positive cycle of the pilot generator 26) are necessary to fire tube 45, the following conditions govern its breakdown: tube 45 cannot fire until point $a$ has been reached and it cannot fire if tube 30 is ignited. It will be seen, however, that for all points from point $a$ through point $c$ (180° minus the angular displacement to point $a$) the combined voltages $E_1+V_1$ are sufficient to fire tube 45. But since tube 30 has been set to fire at point $b$ it will cause relay 34 to open thus removing the plate supply B+ from the tube 45.

Since the voltage cycle operating the tube 30 is in phase with the alternating voltage portion $E_1$ of the combined voltage applied to the control grid of tube 45, it will be seen that the tube 45 can fire only within the narrow, preset limits of points $a$ and $b$ in Figure 6, or for practical purposes, at only one preselected point. Obviously this point corresponds to a predetermined relative position of the rotary members of the two motors.

Breakdown of the tube 45 causes relay 49 to close contact member 60 and thus energize the field application equipment 21, and also to close contact member 61 to assure continuity of anode supply to tube 45 independent of further action of tube 30. Energizing the field application equipment 21 will cause excitation of the field 23 and cause motor 11 to pull into synchronism. The actual relative position of the rotary members of motors 10, 11, now running in synchronism, will be very nearly that for which the hereinbefore described control system had been set. Any slight difference between the selected and actual relative positions will be due to lag during the pull-in period caused by inertia of the rotor and load, and due to the pick-up time of the field application equipment 21. However, with the disclosed control system and known characteristics of the motor and load, an operating position in advance of the desired position can easily be chosen to allow for this lag. A few trial starts with slightly different settings will very soon give the advance necessary to compensate for pick-up and pull-in lag. Thus a much more precise relative positioning of the rotary members of a plurality of synchronous motors can be accomplished. By properly setting the two control potentiometers 42, 56, the firing point of tube 45 can be made to occur anywhere in the first 90° of the positive cycle of the pilot generator output voltage. And operation of both control potentiometers in gang relation permits calibration of the settings of the single control knob 64 in terms of angular displacement from 0° to 90°. This ganging of the control potentiometers is made possible by the provision of the adjusting rheostats 41, 55, manipulation of which permits "tracking" of the two control potentiometers to produce and also to regulate the width of the firing band $a$ to $b$ shown in Figure 6. It is this band that is shifted to any position between 0° and 90° by means of the control knob 64. Obviously any one of the four 90° arcs can be selected by proper initial placement of the contactor cam 58 on the shaft of motor 11.

After the field of motor 11 has been energized, the tubes 30, 45 will cease functioning as their control circuits will be opened by contact members 37, 52, both of which operate with the field application equipment 21.

It is obvious that by suitable switching means the control circuits of the tubes 30, 45 could be shifted to a third motor equipped with a contactor similar to contactor 59, and this motor could then be brought into synchronism at a preselected relative position; and so on for any number of additional motors. Also, by installing a pilot generator and a contactor on each motor and using suitable switching means, any motor could be started first.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. In a control system for synchronous motors, an alternating current source, a first synchronous motor having armature and field windings, means connecting the armature winding to said alternating current source, means connecting the field winding to a direct current source, a second synchronous motor having armature and field windings, means connecting the armature winding of said second motor to said alternating current source, field application equipment for connecting the field winding of said second motor to a direct current source, an electric discharge device having an anode circuit adapted upon the flow of anode current therethrough to actuate said field application equipment, a source of current for said anode circuit, means rendering said discharge device conductive of said anode current upon disposition of the rotary member of said second motor in a predetermined angular rotational position simultaneously with disposition of the rotary member of said first motor in any one of a plurality of predetermined angular rotational positions, and means interrupting the anode circuit during a portion of each revolution of the rotary member of said first motor to prevent the flow of anode current while the rotary member of said first motor is disposed in some but not all of said plurality of angular rotational positions.

2. In a control system for synchronous motors, an alternating current source, a first synchronous motor having armature and field windings, means connecting the armature winding to said alternating current source, means connecting the field winding to a direct current source, a second synchronous motor having armature and field windings, means connecting the armature winding of said second motor to said alternating current source, field application equipment for connecting the field winding of said second motor to a direct current source, an electric discharge device having an anode circuit adapted, upon the flow of current therethrough, to actuate said field application equipment, and a control circuit adapted, upon energization by any voltage within a predetermined range, to permit the flow of anode current, a source of current for said anode circuit, means interrupting said anode circuit during a portion of each revolution of the rotary member of said first motor, means generating a cycle of alternating voltage for each revolution of the rotary member of said first motor, the voltage during a portion of each cycle being within said predetermined range, and means momentarily applying said alternating voltage to said control circuit at a definite point during each revolution of the rotary member of said second motor.

3. In a control system for synchronous motors, an alternating current source, a first synchronous motor having armature and field windings, means connecting the armature winding to said alternating current source, means connecting the field winding to a direct current source, a second synchronous motor having armature and field windings, means connecting the armature winding of said second motor to said alternating current source, field application equipment for connecting the field winding of said second motor to a direct current source, a first electric discharge device having an anode circuit adapted on energization to actuate said field application equipment, a source of current for said anode circuit, an alternating voltage generator driven by said first motor and having a maximum voltage output at a predetermined angular rotation position during each revolution of the rotary member of said first motor, a contactor driven by the second motor and adapted to derive voltage pulses from said generator output each occurring at a predetermined angular rotational position of the rotary member of said second motor and each of a magnitude dictated by the relative angular rotational relation of the rotary members of said first and second motors upon the occurrence of each voltage pulse, means utilizing said voltage pulses to render said discharge device conductive of said anode current upon the existence of said predetermined angular rotational position of the rotary member of said second motor simultaneous with the existence of any one of a plurality of predetermined angular rotational positions of the rotary member of said first motor, a second electric discharge device, means adapted upon the flow of discharge current through said second discharge device to prevent energization of said circuit, and means operating said second discharge device during a portion of each revolution of the rotary member of said first motor.

4. In a control system for synchronous motors, an alternating current source, a first synchronous motor having armature and field windings, means connecting the armature winding to said alternating current source, means connecting the field winding to a direct current source, a second synchronous motor having armature and field windings, means connecting the armature winding of said second motor to said alternating current source, field application equipment for connecting the field winding of said second motor to a direct current source, a first electric discharge device having an anode circuit adapted on energization to actuate said field application equipment, a source of current for said anode circuit, an alternating voltage generator driven by said first motor and having a maximum voltage output at a predetermined angular rotational position during each revolution of the rotary member of said first motor, a contactor driven by the second motor and adapted to derive voltage pulses from said generator output each occurring at a predetermined angular rotational position of the rotary member of said second motor, whereby pulses of greater magnitude are derived by said contactor from said alternating voltage output as the rotary members of said first and second motors approach a predetermined angular rotational positional relation, means utilizing said voltage pulses of greater magnitude for rendering said electric discharge device conductive of said anode current, a second electric discharge device, means adapted upon the flow of discharge current through said second discharge device to prevent energization of said anode circuit, and means rendering said second discharge device conductive at intervals once during each revolution of the rotary member of the first motor.

5. In a control system for synchronous motors, an alternating current source, a first synchronous motor having armature and field windings, means connecting the armature winding to said alternating current source, means connecting the field winding to a direct current source, a second synchronous motor having armature and field windings, means connecting the armature winding of said second motor to said alternating current source, field application equipment for connecting the field winding of said second motor to a direct current source, a first electric discharge device having an anode, a cathode and a control electrode, an anode circuit for said discharge device adapted on the flow of anode current therethrough to actuate said field application equipment, a source of current for said anode circuit, an alternating voltage generator driven by said first motor and generating a cycle of alternating voltage for each revolution of the first motor, a control circuit for impressing voltage from said generator on said control electrode, the voltage generated during only a portion of each cycle being of a magnitude which, when impressed on said control electrode, will render said discharge device conductive of said anode current, a contactor driven by said second motor and momentarily closing said control circuit once during each revolution of the rotary member of said second motor, and thus impressing on said control electrode voltage pulses each of a magnitude dictated by the angular rotational positional relation of the rotary members of said first and second motors, a second electric discharge device having an anode, a cathode, and a control electrode, relay means interrupting the anode circuit of said first discharge device during the flow of anode current through said second discharge device, and a control circuit for impressing alternating voltage from said generator on the control electrode of said second discharge device, said alternating voltage during only a portion of each cycle being of a magnitude which will render said second device conductive.

6. In a control system for synchronous motors, an alternating current source, a first synchronous motor having armature and field windings, means connecting the armature winding to said alternating current source, means connecting the field winding to a direct current source, a second synchronous motor having armature and field windings, means connecting the armature winding of said second motor to said alternating current source, field application equipment for connecting the field winding of said second motor to a direct current source, a first electric discharge device of the gaseous type and having an anode, a cathode, and a control electrode, an anode circuit for said discharge device adapted on the flow of anode current therethrough to actuate said field application equipment, a source of current for said anode circuit, an alternating voltage generator driven by said first motor and generating a cycle of alternating voltage for each revolution of the first motor, a control circuit including a control potentiometer for impressing voltage from said generator on said control electrode, the voltage generated during only a portion of each cycle being of a magnitude which, when impressed on said control electrode, will render said discharge device conductive of said anode current, a contactor driven by said second motor and momentarily closing said control circuit once during each revolution of the rotary member of said second motor, and thus impressing on said control electrode voltage pulses each of a magnitude dictated by the angular rotational positional relation of the rotary members of said first and second motors, a second electric discharge device of the gaseous type having an anode, a cathode, and a control electrode, relay means interrupting the anode circuit of said first discharge device during the flow of anode current through said second discharge device, and a control circuit including a control potentiometer for impressing alternating voltage from said generator on the control electrode of said second discharge device, said alternating voltage during only a portion of each cycle being of a magnitude which, when impressed on said last-mentioned control electrode, will render said second discharge device conductive.

LEONARD FREINKEL.

REFERENCES CITED

The following references are of record in the file of this patent:

UNITED STATES PATENTS

| Number | Name | Date |
|---|---|---|
| 1,977,384 | Gulliksen | Oct. 16, 1934 |
| 2,249,821 | Gulliksen | July 22, 1941 |

FOREIGN PATENTS

| Number | Country | Date |
|---|---|---|
| 328,857 | Great Britain | Mar. 19, 1930 |